(12) United States Patent
Lawton et al.

(10) Patent No.: US 11,518,548 B2
(45) Date of Patent: Dec. 6, 2022

(54) DEPLOYABLE SPACECRAFT BODY

(71) Applicant: Oxford Space Systems Limited, Harwell (GB)

(72) Inventors: Michael David Lawton, Harwell (GB); Zhong You, Old Marston (GB); Deborah Fellows, Harwell (GB)

(73) Assignee: Oxford Space Systems Limited, Oxfordshire (GB)

( * ) Notice: Subject to any disclaimer, the term of this patent is extended or adjusted under 35 U.S.C. 154(b) by 198 days.

(21) Appl. No.: 16/978,087

(22) PCT Filed: Mar. 7, 2019

(86) PCT No.: PCT/GB2019/050637
§ 371 (c)(1),
(2) Date: Sep. 3, 2020

(87) PCT Pub. No.: WO2019/171062
PCT Pub. Date: Sep. 12, 2019

(65) Prior Publication Data
US 2021/0061496 A1   Mar. 4, 2021

(30) Foreign Application Priority Data

Mar. 7, 2018   (GB) ...................................... 1803618

(51) Int. Cl.
*B64G 1/22* (2006.01)
*B64G 1/24* (2006.01)
(Continued)

(52) U.S. Cl.
CPC ............. *B64G 1/222* (2013.01); *B64G 1/244* (2019.05); *B64G 1/428* (2013.01); *B64G 1/641* (2013.01); *B64G 1/66* (2013.01); *B64G 2001/643* (2013.01)

(58) Field of Classification Search
CPC .... B64G 1/222; B64G 2001/643; B64G 1/66; B64G 1/428
See application file for complete search history.

(56) References Cited

U.S. PATENT DOCUMENTS 6,568,638 B1   5/2003   Capots
8,525,729 B1   9/2013   Martin
(Continued)

FOREIGN PATENT DOCUMENTS

EP   0888967 A1   1/1999
EP   1559649 A1   8/2005
(Continued)

OTHER PUBLICATIONS

European Patent Office, International Search Report and Written Opinion, dated Jul. 26, 2019.
(Continued)

*Primary Examiner* — Timothy D Collins
*Assistant Examiner* — Eric Acosta
(74) *Attorney, Agent, or Firm* — Umberg Zipser LLP; Ryan Dean

(57) ABSTRACT

A spacecraft is disclosed, comprising a deployable spacecraft body (110) comprising a plurality of sub-systems (321-324) for controlling operations of the spacecraft, and a plurality of panels (101, 102) and a plurality of hinges (112-115) each connecting adjacent ones of the plurality of panels, the hinges being arranged to permit the plurality of panels to be folded into a stowed configuration and unfolded
(Continued)

into a deployed configuration, wherein the plurality of sub-systems are fixed to and supported by one or more of the plurality of panels. By forming the body of the spacecraft from a deployable structure, the overall size of the spacecraft can be significantly reduced in the stowed configuration. In some embodiments, a plurality of the spacecraft in the stowed configuration can be combined into a modular spacecraft assembly prior to launch, with data and power connections between the plurality of stowed spacecraft being used to transfer power from, and data to, a payload monitoring unit on the launch vehicle.

20 Claims, 4 Drawing Sheets

(51) Int. Cl.
*B64G 1/42* (2006.01)
*B64G 1/64* (2006.01)
*B64G 1/66* (2006.01)

(56) References Cited

U.S. PATENT DOCUMENTS

| 8,888,050 B1* | 11/2014 | Murphy | B64G 1/641 |
| | | | 244/173.3 |
| 2011/0204186 A1* | 8/2011 | Keller | B64G 1/222 |
| | | | 244/172.6 |

FOREIGN PATENT DOCUMENTS

| EP | 2498334 B1 | 10/2016 |
| JP | 2015168422 A | 9/2015 |
| WO | 2015090351 A1 | 6/2015 |

OTHER PUBLICATIONS

Hyman N L, An Alternative to Deployed Thermal Radiators: Deployed Equipment Modules With Individual Package Temperature Control, AIAA/USU Conference on Small Satell, Sep. 1, 1997, pp. 1-12.

India Patent Office, Examination Report, International Application No. 202047042705, dated Apr. 21, 2022, 7 pages.

* cited by examiner

DEPLOYABLE SPACECRAFT BODY

TECHNICAL FIELD

The present invention relates to structures for forming the body of a spacecraft.

BACKGROUND

In conventional spacecraft, such as satellites, instruments and subsystems are generally mounted on a strong supporting framework which takes the form of a central box, commonly referred to as the spacecraft or satellite "bus". Various deployable structures such as solar arrays, scientific instruments and antennas can be mounted on the bus. The bus provides the satellite with its structural integrity and provides protection for internal components against environmental factors such as temperature and radiation.

The invention is made in this context.

SUMMARY OF THE INVENTION

According to a first aspect of the present invention, there is provided a spacecraft comprising a plurality of sub-systems for controlling operations of the spacecraft, and a deployable spacecraft body comprising a plurality of panels and a plurality of hinges each connecting adjacent ones of the plurality of panels, the hinges being arranged to permit the plurality of panels to be folded into a stowed configuration and unfolded into a deployed configuration, wherein the plurality of sub-systems are fixed to and supported by one or more of the plurality of panels.

In some embodiments according to the first aspect, one or more of the plurality of hinges are configured to store elastic energy in the stowed configuration for automatically deploying the spacecraft body.

In some embodiments according to the first aspect, the spacecraft further comprises a powered deployment mechanism for controlled deployment of the spacecraft body. The powered deployment mechanism may be controllable to re-stow, either partially or fully, the deployable spacecraft body while the spacecraft is in space.

In some embodiments according to the first aspect, the plurality of hinges are configured to lock the spacecraft body into the deployed configuration after deployment from the stowed configuration.

In some embodiments according to the first aspect, the plurality of panels and the plurality of hinges are integrally formed from a composite material, and the plurality of panels are configured to have a higher stiffness than the plurality of hinges.

In some embodiments according to the first aspect, the spacecraft comprises a plurality of flexible electrical interconnects arranged to electrically connect ones of the plurality of sub-systems fixed to different ones of the plurality of panels.

In some embodiments according to the first aspect, the plurality of flexible electrical interconnects are embedded in the composite material of the plurality of hinges.

In some embodiments according to the first aspect, the plurality of panels comprise one or more interior panels and one or more peripheral panels arranged to be situated further from a centre of the spacecraft body than the one or more interior panels, in the deployed configuration, wherein the one or more interior panels have a higher stiffness than the one or more peripheral panels. In some embodiments according to the first aspect, one or more of the plurality of sub-systems are housed within one or more of the interior panels.

In some embodiments according to the first aspect, the plurality of sub-systems comprise an attitude and orbit control sub-system for attitude control of the spacecraft, said attitude and orbit control sub-system being fixed to one or more of the interior panels.

In some embodiments according to the first aspect, the spacecraft further comprises a radio frequency RF patch mounted on a surface of one of the plurality of panels, and a driving circuit for providing electrical power to drive the RF patch, wherein the driving circuit is housed within said one of the plurality of panels.

In some embodiments according to the first aspect, the spacecraft further comprises a non-directly driven antenna mounted on a surface of one or more of the plurality of panels.

In some embodiments according to the first aspect, the non-directly driven antenna is a holographic surface antenna or a meta-material antenna comprising a plurality of antenna segments mounted on adjacent ones of the plurality of panels, and an antenna feed connected to feed point on one of the plurality of antenna segments.

In some embodiments according to the first aspect, the non-directly driven antenna is a reflect array antenna comprising a reflective surface mounted on one or more of the plurality of panels, and an antenna feed arranged to illuminate the reflective surface when the plurality of panels are in the deployed configuration.

In some embodiments according to the first aspect, one or more of the plurality of panels are configured to electrically shield respective ones of the plurality of sub-systems fixed thereto.

In some embodiments according to the first aspect, the plurality of hinges are arranged to connect each one of the plurality of panels to two adjacent ones of the plurality of panels.

In some embodiments according to the first aspect, the plurality of hinges are arranged to connect the plurality of panels so as to form a chain of panels connected in a loop.

In some embodiments according to the first aspect, in the deployed configuration each one of the plurality of panels is configured to abut an adjacent one of the plurality of panels, such that the spacecraft body forms a structure with a continuous surface in the deployed configuration.

In some embodiments according to the first aspect, a supporting structure of the spacecraft consists or substantially consists of the deployable spacecraft body.

According to a second aspect of the present invention, there is provided apparatus comprising a plurality of stowed spacecraft each comprising a spacecraft according to the first aspect in the stowed configuration, and a plurality of interfaces for transmitting power and telemetry data from each spacecraft to a payload monitoring unit of a launch vehicle for launching the plurality of spacecraft.

According to a third aspect of the present invention, there is provided a launch vehicle comprising a payload bay containing the apparatus according to the second aspect, and a payload monitoring unit arranged to deliver power to, and receive the telemetry data from, the plurality of stowed spacecraft via the plurality of interfaces for monitoring the status of, and providing power to, each one of the plurality of stowed spacecraft.

According to a fourth aspect of the present invention, there is provided a method of de-orbiting a spacecraft according to the first aspect, the method comprising re-orienting the spacecraft such that the spacecraft body presents an increased surface area to the atmosphere in a direction of travel of the spacecraft. In some embodiments according to the fourth aspect, the spacecraft is de-orbited from a low-earth orbit.

BRIEF DESCRIPTION OF THE DRAWINGS

Embodiments of the present invention will now be described, by way of example only, with reference to the accompanying drawings, in which.

DETAILED DESCRIPTION

Figure 1:
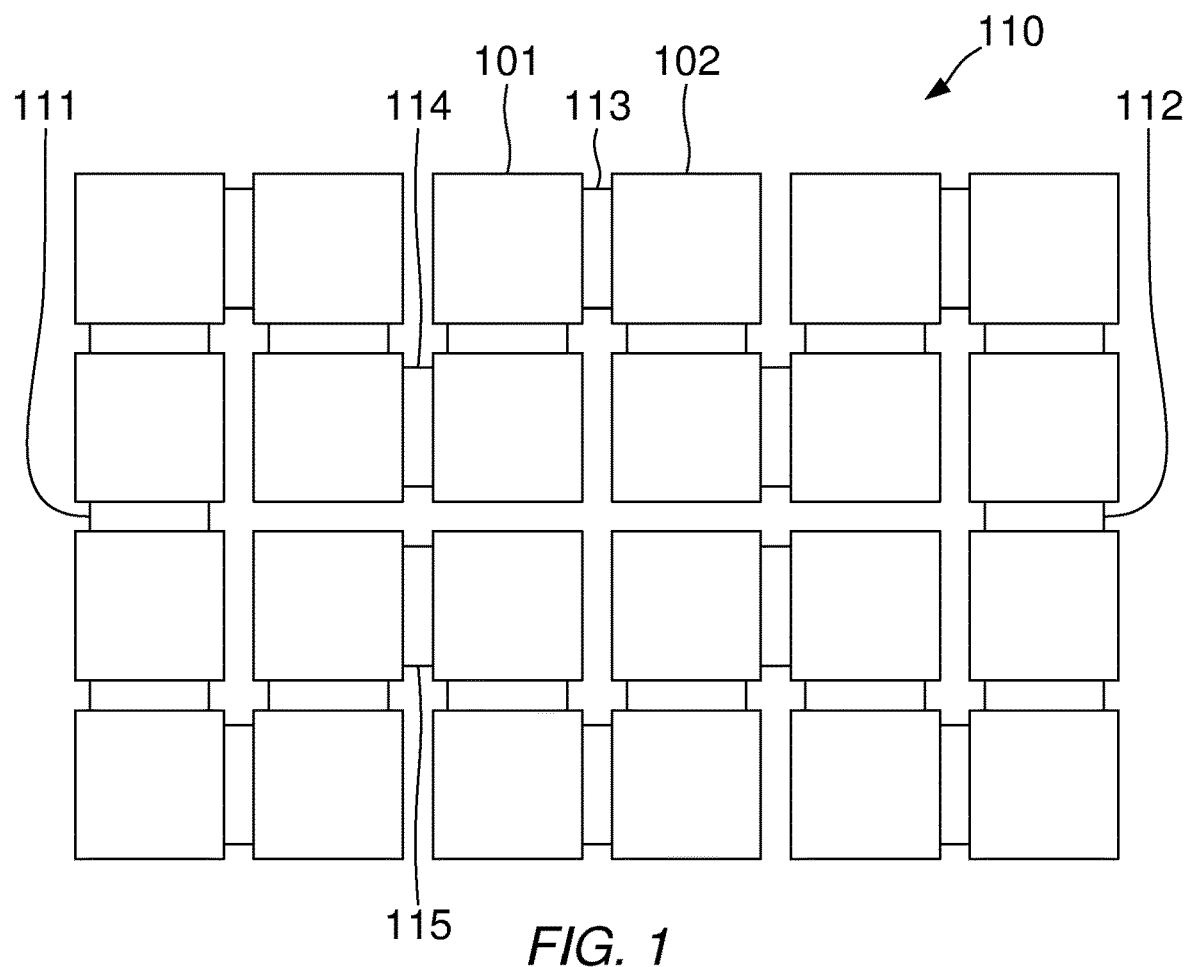
FIG. 1 illustrates a deployable structure for forming the body of a spacecraft, according to an embodiment of the present invention.

In the following detailed description, only certain exemplary embodiments of the present invention have been shown and described, simply by way of illustration. As those skilled in the art would realise, the described embodiments may be modified in various different ways, all without departing from the scope of the present invention. Accordingly, the drawings and description are to be regarded as illustrative in nature and not restrictive. Like reference numerals designate like elements throughout the specification.

Figure 2:
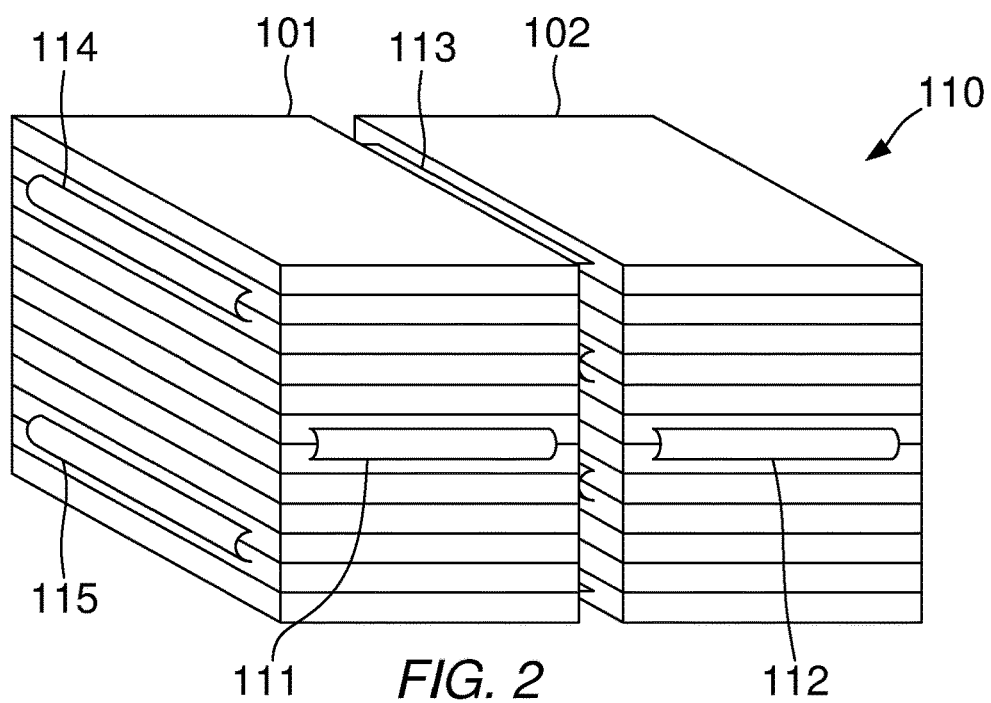
FIG. 2 illustrates the deployable structure folded into a stowed configuration, according to an embodiment of the present invention.

Referring now to FIG. 1, a deployable structure for forming the body of a spacecraft is illustrated in a deployed configuration, according to an embodiment of the present invention. FIG. 2 illustrates the deployable structure folded into a stowed configuration. As shown in FIG. 1, the deployable spacecraft body 110 comprises a plurality of panels 101, 102 and a plurality of hinges 111, 112, 113, 114, 115. Each hinge 113 connects adjacent ones of the plurality of panels 101, 102. The plurality of hinges 111, 112, 113, 114, 115 are arranged to permit the plurality of panels 101, 102 to be folded into a stowed configuration as shown in FIG. 2.

In the stowed configuration, a plurality of the panels 101, 102 are stacked on top of one another, thereby reducing an overall footprint of the structure. As a result, a spacecraft in which the various sub-systems are mounted on the deployable body 110, as opposed to being mounted to a fixed box-shaped supporting framework ('bus'), can occupy a smaller volume in the payload bay of a launch vehicle than a conventional spacecraft. For example, the deployable body 110 may be used as the body of a spacecraft such as a satellite or a space probe. The structure 110 can subsequently be unfolded into the deployed configuration shown in FIG. 1.

In the present embodiment the spacecraft body 110 comprises square panels, however in other embodiments different shapes of panels may be used. The panel shapes may be chosen such that the interior panels substantially fill the available space between the outermost peripheral panels, providing a planar structure that has a substantially continuous surface in the deployed configuration without any large gaps between panels. In FIG. 1 the space between panels is exaggerated for clarity. In some embodiments, in the deployed configuration each one of the plurality of panels 101, 102 is configured to abut an adjacent one of the plurality of panels 101, 102 such that the spacecraft body 110 forms a structure with a continuous surface. This arrangement can increase the overall rigidity and structural integrity of the spacecraft, since each panel can be held in position by the adjacent abutting panels and thereby prevented from moving with respect to the adjacent panels.

In some embodiments, one or more of the plurality of hinges 111, 112, 113, 114, 115 can be configured to store elastic energy when the hinge is folded. For example, tape-spring hinges may be used. In this way, elastic energy can be stored in the hinges 111, 112, 113, 114, 115 while the spacecraft body 110 is in the stowed configuration. The stored elastic energy can assist in automatically deploying the spacecraft body 110.

Depending on the embodiment the plurality of hinges 111, 112, 113, 114, 115 may all have the same construction, or different types of hinges may be used. For example, in some embodiments only certain ones of the plurality of hinges 111, 112, 113, 114, 115 may be configured to store elastic energy, and other ones of the plurality of hinges 111, 112, 113, 114, 115 may be simple mechanical hinges which do not store energy when opened or closed.

In embodiments in which the plurality of hinges 111, 112, 113, 114, 115 do not store elastic energy in the stowed configuration, a separate deployment mechanism may be provided. For example, a powered deployment mechanism comprising servos or other actuators may be used to unfold the panels 101, 102 into the deployed configuration. Providing a powered deployment mechanism can allow the deployment procedure to be tested prior to launch.

In some embodiments of the present invention a powered deployment mechanism may be used to partially or fully re-stow the spacecraft while in orbit. For example, a satellite in a low Earth orbit (LEO) can encounter drag from the Earth's atmosphere which causes the satellite to lose altitude over time, and as a result the satellite must expend fuel to move back to a higher orbit. Therefore in some embodiments of the present invention, the deployable body of a LEO satellite may be temporarily re-stowed using a powered deployment mechanism to reduce the drag on the satellite and so conserve fuel. For example, the deployable body may be re-stowed when the satellite is not currently in use. As a further example, in some embodiments a deployable body of a satellite may be temporarily re-stowed if the satellite is due to pass through a debris field, to reduce the risk of an impact on the satellite body, or may be re-stowed to provide additional electrical or radiation shielding for the sub-systems in the event of a solar flare being detected. As yet another example, in some embodiments a deployable body of a spacecraft such as a space probe may be partially or fully re-stowed as the probe passes through the asteroid belt or solar flux, to reduce the exposed surface area of the spacecraft.

The plurality of hinges 111, 112, 113, 114, 115 may be configured to lock the spacecraft body 110 into the deployed configuration after deployment from the stowed configuration. For example, when tape-spring hinges are used, the self-locking ability of the tape-spring hinges 111, 112, 113, 114, 115 can assist in locking the panels 101, 102 of the spacecraft body 110 into the deployed configuration.

In some embodiments, the plurality of panels 101, 102 and the plurality of hinges 111, 112, 113, 114, 115 may be integrally formed from a composite material, such as a fibre-reinforced composite. In embodiments in which the panels 101, 102 and hinges 111, 112, 113, 114, 115 are integrally formed, the plurality of panels 101, 102 are configured to have a higher stiffness than the plurality of hinges 111, 112, 113, 114, 115. For example, a higher fibre density may be used in the composite material that forms the panels 101, 102, compared to a fibre density of the composite material that forms the hinges 111, 112, 113, 114, 115, and/or a greater thickness of material may be used in the panels 101, 102 than in the hinges 111, 112, 113, 114, 115. By using a fibre-reinforced composite to form the deployable spacecraft body 110, the mass of the spacecraft can be reduced in comparison to conventional bus-based spacecraft, while still achieving the necessary strength and rigidity in the deployed configuration.

In the present embodiment, the plurality of hinges 111, 112, 113, 114, 115 are arranged to connect each one of the plurality of panels 101, 102 to two adjacent ones of the plurality of panels 101, 102. In this way, the plurality of panels 101, 102 are connected so as to form a chain. This allows the panels 101, 102 to be folded about the hinges 111, 112, 113, 114, 115 and stacked on top of one another in the stowed configuration, as shown in FIG. 2. Furthermore, in the present embodiment the plurality of hinges 111, 112, 113, 114, 115 are arranged so that the plurality of panels 101, 102 are connected to form a loop. This arrangement can help to increase the overall rigidity of the structure 110 in the deployed configuration, whilst enabling the structure 110 to be folded into a highly compact stowed configuration.

Figure 3:
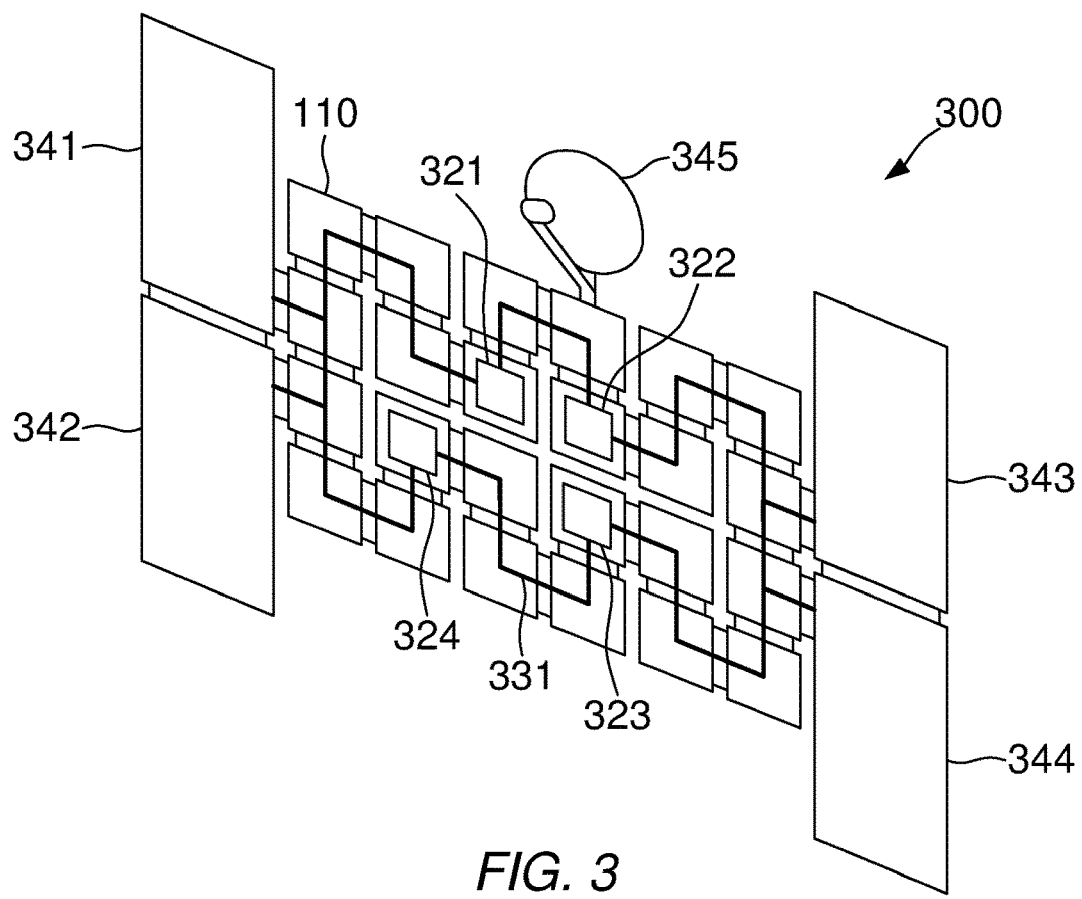
FIG. 3 illustrates a satellite comprising the deployable structure, according to an embodiment of the present invention.

Referring now to FIG. 3, a satellite comprising the deployable structure is illustrated, according to an embodiment of the present invention. The satellite 300 comprises a plurality of satellite sub-systems 321, 322, 323, 324 for controlling operations of the satellite 300, which may be similar to standard sub-systems in conventional satellites, and further comprises the deployable satellite body 110 of FIGS. 1 and 2. The plurality of satellite sub-systems 321, 322, 323, 324 are fixed to and supported by one or more of the plurality of panels 101, 102 of the deployable satellite body 110. The satellite sub-systems 321, 322, 323, 324 can be arranged in such as way so as not to interfere with each other or with the plurality of panels 101, 102 when the structure is folded into the stowed configuration.

The satellite 300 may further comprise one or more mission-specific components mounted to the deployable body, such as one or more solar panels 341, 342, 343, 344 and/or antennas and/or instruments 345, in addition to the satellite sub-systems 321, 322, 323, 324. For example, in some embodiments the satellite may further comprise a radio frequency (RF) patch mounted on a surface of one of the plurality of panels, and a driving circuit for providing electrical power to drive the RF patch. The driving circuit can be housed within the same panel to which the RF patch is mounted, thereby minimising the length of cabling or waveguide needed to connect the driving circuit to the RF patch.

As an alternative to an RF patch antenna, in some embodiments one or more of the plurality of panels that form the spacecraft body may contain a non-directly driven antenna. Examples of types of non-directly driven antennas that may be suitable for use in embodiments of the present invention include, but are not limited to, a holographic surface antenna, a meta-material antenna, a high-impedance surface (HIS) antenna, or a reflect array antenna.

Figure 6:
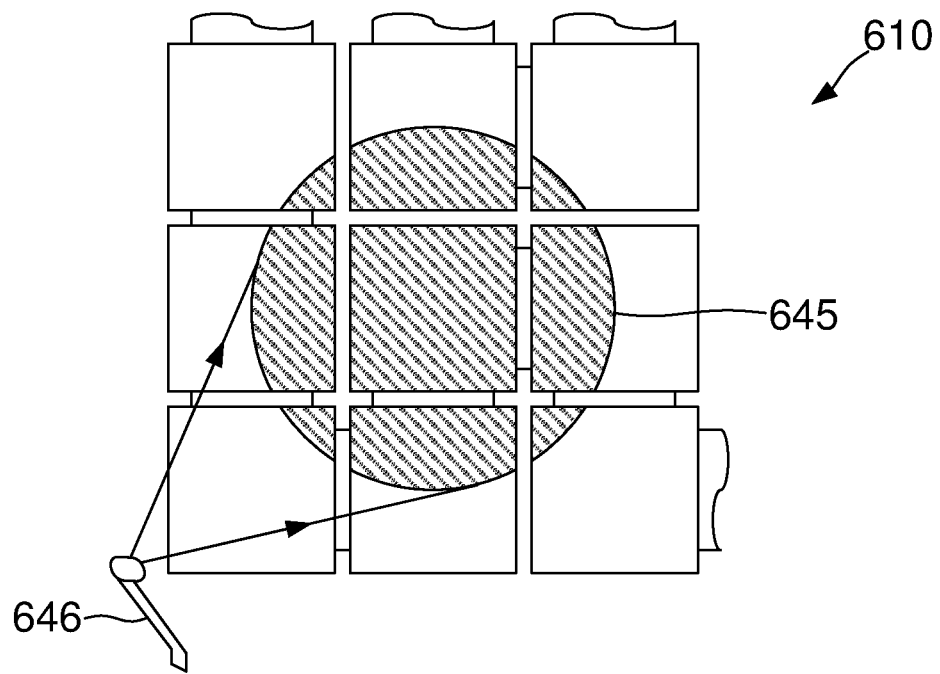
FIG. 6 illustrates a satellite comprising a reflect array antenna, according to an embodiment of the present invention.

FIG. 6 illustrates an embodiment in which a satellite 610 comprises a reflect array antenna, the antenna comprising a reflective surface 645 mounted on one or more of the plurality of panels, and an antenna feed 646, such as a feed horn, mounted on another one of the plurality of panels. In the deployed configuration, the antenna feed 646 may be disposed facing the reflective surface 645 so as to illuminate the reflective surface 645.

Figure 7:
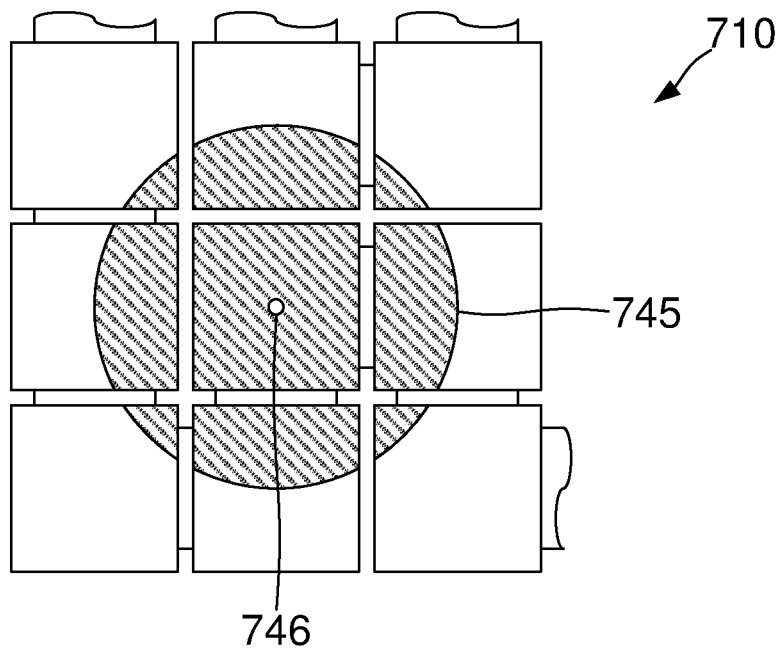
FIG. 7 illustrates a satellite comprising a holographic surface antenna, according to an embodiment of the present invention.

In embodiments in which a non-directly driven antenna is used, a physical RF interconnect may not be required between a driving circuit and every panel on which part of the antenna is mounted. In the case of a reflect array antenna, a direct connection is not required to any of the panels on which the reflective surface is mounted, since the reflective surface is illuminated by the antenna feed mounted on another panel. As another example, FIG. 7 illustrates an embodiment in which a satellite 710 comprises a holographic surface antenna comprising a plurality of antenna segments 745 mounted on adjacent ones of the plurality of panels. In such embodiments, a connection is only required to a feed point 746 on one of the plurality of antenna segments. In such embodiments, the plurality of antenna segments 745 act as a single holographic surface in the deployed configuration, and the antenna feed 746 launches a wave across the plurality of antenna segment 745 without a separate feed point being required for each segment 745.

Consequently, in embodiments in which a non-directly driven antenna is used, the spacecraft design can be simplified since it is not necessary to provide cabling or waveguides to connect every panel of the antenna to a driving circuit on another panel. As explained above, a non-directly driven antenna only requires minimal feed points, which can be located on the same panel as the antenna (e.g. in the case of a holographic surface antenna) or on another panel of the spacecraft body (e.g. in the case of a reflect array antenna).

In some embodiments a solar panel and/or a transmit/receive antenna may be mounted directly on the surface of one of the panels, that is, mounted flush to the panel rather than on a separate deployable structure attached to the panel. For example, a satellite comprising the deployable body 110 may comprise one or more solar panels mounted on the surface of one or more panels on one side of the body 110, and may further comprise one or more antennas mounted on the surface of one or more panels on an opposite side of the body 110. While in orbit, the satellite can be oriented so that the side of the body 110 on which the one or more antennas are mounted faces towards the Earth, while the opposite side of the body 110 on which the one or more solar panels are mounted faces away from the Earth. This arrangement allows the satellite to remain in contact with the ground at all times, while the solar panels face away from the Earth to collect solar radiation as the satellite passes between the Earth and the Sun. Furthermore, in embodiments in which components such as solar panels or antennas are mounted directly on the surface of a panel, the same panel may house one or more sub-systems internally within the panel. This arrangement can help to reduce the overall size and mass of the satellite.

Here, the term "spacecraft sub-system" refers to any system which is used to control and operate the spacecraft. Examples of spacecraft sub-systems include telemetry, navigation, an attitude and orbit control sub-system (AOCS), a radio communications sub-system, and power supply and power conditioning sub-systems (PCS). In the embodiment shown in FIG. 3, the spacecraft is a satellite 300, and hence the sub-systems 321, 322, 323, 324 may be referred to as satellite sub-systems. The satellite sub-systems may provide mission-critical functions without which the satellite 300 would be rendered inoperable, which are basic operations that in general may be common to most, if not all, satellites. In a conventional satellite, such sub-systems are mounted directly within the satellite bus. In contrast, in embodiments of the present invention such sub-systems are mounted to a deployable body 110 instead of a bus, allowing the entire satellite 300 to be folded into a compact stowed configuration for launch. The deployable body 110 therefore effectively replaces the bus of a conventional satellite, and gives the satellite 300 the necessary structural integrity when in the deployed configuration. The supporting structure of the satellite 300 may consist or substantially consist of the satellite body 110.

Depending on the embodiment, the plurality of satellite control systems 321, 322, 323, 324 may be mounted to a single one of the plurality of panels 101, 102, or may be mounted to different panels 101, 102. In the present embodiment the plurality of satellite control systems 321, 322, 323, 324 are mounted to different panels 101, 102, and the satellite 300 further comprises a plurality of flexible electrical interconnects 331 arranged to electrically connect ones of the plurality of satellite control systems 321, 322, 323, 324 fixed to different ones of the plurality of panels 101, 102. For example, the flexible interconnects 331 may be in the form of wires or ribbon cables connecting adjacent panels 101, 102. In embodiments in which the hinges 111, 112, 113, 114, 115 are formed from a composite material, the flexible electrical interconnects 331 may be embedded in the composite material of the hinges 111, 112, 113, 114, 115. In this way, the material in which the interconnect 331 is embedded can provide an additional layer of protection for the interconnect 331.

In some embodiments, the plurality of panels 101, 102 may comprise one or more interior panels and one or more peripheral panels. Here, the term "peripheral panel" is used to refer to a panel that is situated further from a centre of the satellite body 110 than an interior panel, in the deployed configuration. In the embodiment illustrated in FIGS. 1 to 3, there are a total of sixteen panels arranged around the circumference of the body 110 in the deployed configuration. These sixteen panels may be referred to as the peripheral panels. The remaining eight panels, which are arranged in a 2×4 array near the centre of the satellite body 110, may be referred to as the interior panels.

The interior panels and the peripheral panels may be constructed differently. For example, one of more of the interior panels may be thicker in cross-section than one or more of the peripheral panels. This can help to increase the rigidity of the deployable body 110 in the deployed configuration, by providing a stiff core of interior panels to which the thinner, lighter peripheral panels are connected. By using peripheral panels which are lighter than the interior panels, the moment of inertia of the satellite 300 in the deployed configuration can be reduced. For example, in some embodiments the plurality of satellite control systems 311, 312, 313, 314 may include one or more AOCS for attitude control of the satellite 300. When the AOCS is mounted to an interior panel which has a higher mass than the peripheral panels, the moment of inertia of the satellite 300 can be reduced and hence the force that must be exerted on the satellite 300 by the AOCS to adjust the attitude of the satellite 300 can also be reduced. In some embodiments one or more other ones of the sub-systems 321, 322, 323, 324 as well as the AOCS may also be fixed to the interior panels to move the centre of mass closer to the centre of the deployable body 110.

Furthermore, in embodiments in which one or more of the sub-systems 321, 322, 323, 324 are housed within one or more of the panels 101, 102, the thickness and hence the mass of each panel which houses one or more sub-systems 321, 322, 323, 324 may be higher than other panels which do not house sub-systems. In addition, the wall thickness of a panel which houses a sub-system may be increased relative to the total thickness of a panel which does not house a sub-system, so as to provide additional radiation or electrical shielding for the internal components of the sub-system. In embodiments in which one or more sub-systems are housed within panels, the sub-systems may be housed within the interior panels so that the mass of the interior panels is increased further relative to the peripheral panels, thereby moving the centre of mass still closer to the centre of the body 110 and assisting with attitude control as described above.

One or more of the plurality of panels 101, 102 of the deployable body may be configured to electrically shield the plurality of satellite sub-systems 311, 312, 313, 314. For example, a panel may be hollow and may be formed from an electrically conductive material, such as metal or a conducting polymer. A satellite sub-system 311, 312, 313, 314 can be mounted internally within the panel 101, 102, which can act as a Faraday cage and shield the internally-mounted satellite sub-system 311, 312, 313, 314 from electrical interference.

In other embodiments one or more of the satellite sub-systems 311, 312, 313, 314, and/or an additional mission-specific system, may be mounted on the outer surface of one of the panels 101, 102, as shown in FIG. 3. For example, a satellite sub-system 311, 312, 313, 314 may be mounted on the surface of a panel 101, 102 without electrical shielding if the system is deemed not particularly susceptible to electrical interference, or additional external shielding may be provided if needed.

In the present embodiment, the deployable satellite body 110 is configured to deploy into a flat, planar configuration as shown in FIGS. 1 and 3. As a result, the satellite body 110 can have a larger surface area relative to the total mass of the satellite 300, in comparison to conventional satellites in which the satellite structure consists of a fixed box-shaped bus. The larger surface area can assist with end-of-life de-orbiting, particularly when a satellite is in a Low Earth Orbit (LEO). For example, during operation the satellite 300 can be oriented so that the large surface area of the body 110 is facing downwards towards the Earth. At the end of the operational life of the satellite, the satellite 300 can be re-oriented through approximately 90° such that the satellite body presents an increased surface area to the atmosphere in a direction of travel of the satellite and thus initiate a de-orbiting sequence. This will result in increased drag on the satellite 300, causing it to lose velocity and altitude more rapidly and eventually burn up on re-entry to the Earth's atmosphere.

Figure 4:
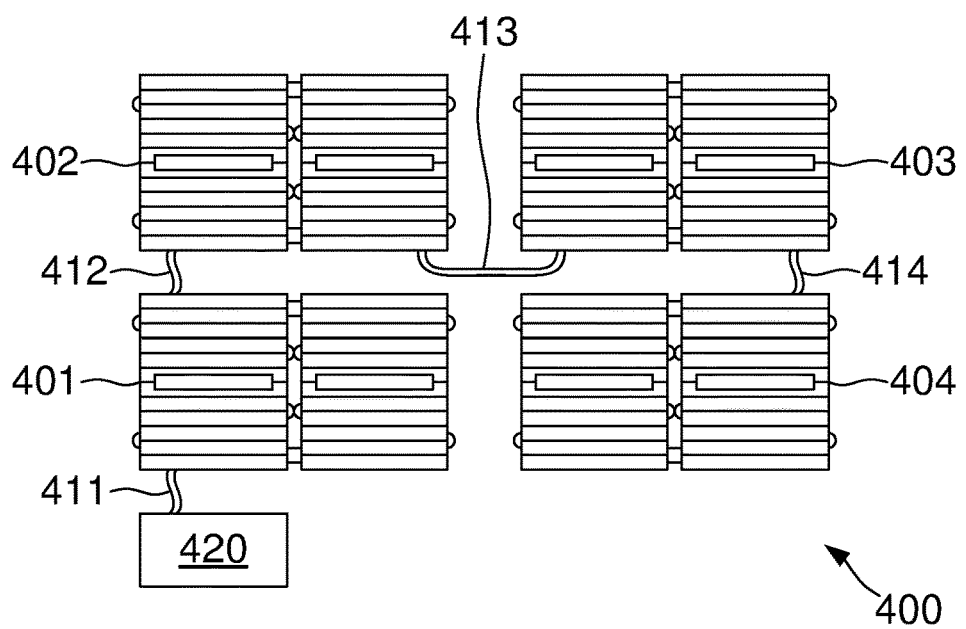
FIG. 4 illustrates an assembly comprising a plurality of interconnected satellites in the stowed configuration, according to an embodiment of the present invention.

Referring now to FIG. 4, a modular launch assembly comprising a plurality of interconnected satellites in the stowed configuration is illustrated, according to an embodiment of the present invention. The modular launch assembly 400 comprises a plurality of stowed satellites 401, 402, 403, 404. Each stowed satellite 401, 402, 403, 404 comprises a satellite with a deployable body in the stowed configuration, similar to the embodiment illustrated in FIGS. 1 to 3. The modular launch assembly 400 further comprises a plurality of data interfaces 411, 412, 413, 414 for transmitting telemetry data and power from each satellite 401, 402, 403, 404 to a satellite monitoring unit 420. In the present embodiment four satellites 401, 402, 403, 404 are illustrated, but in other embodiments any number of satellites may be connected together in a modular launch assembly.

In the present embodiment the plurality of data interfaces 411, 412, 413, 414 comprise cables connecting an output port on one satellite to an input port on an adjacent satellite. In other embodiments a difference type of interface may be used, for example a wireless interface. In the present embodiment the cables 411, 412, 413, 414 connect the plurality of satellites 401, 402, 403, 404 and the satellite monitoring unit 420 in series, so that data and power from each satellite can be passed along the chain of satellites 401, 402, 403, 404 and ultimately received by the satellite monitoring unit 420. In this way, the satellite monitoring unit 420 can gather telemetry data from all of the satellites 401, 402, 403, 404 while in the stowed configuration, to monitor the status of each satellite 401, 402, 403, 404 before and during a launch procedure. Once in space, the data interfaces 411, 412, 413, 414 may be disconnected and the satellites 401, 402, 403, 404 placed into separate orbits.

Figure 5:
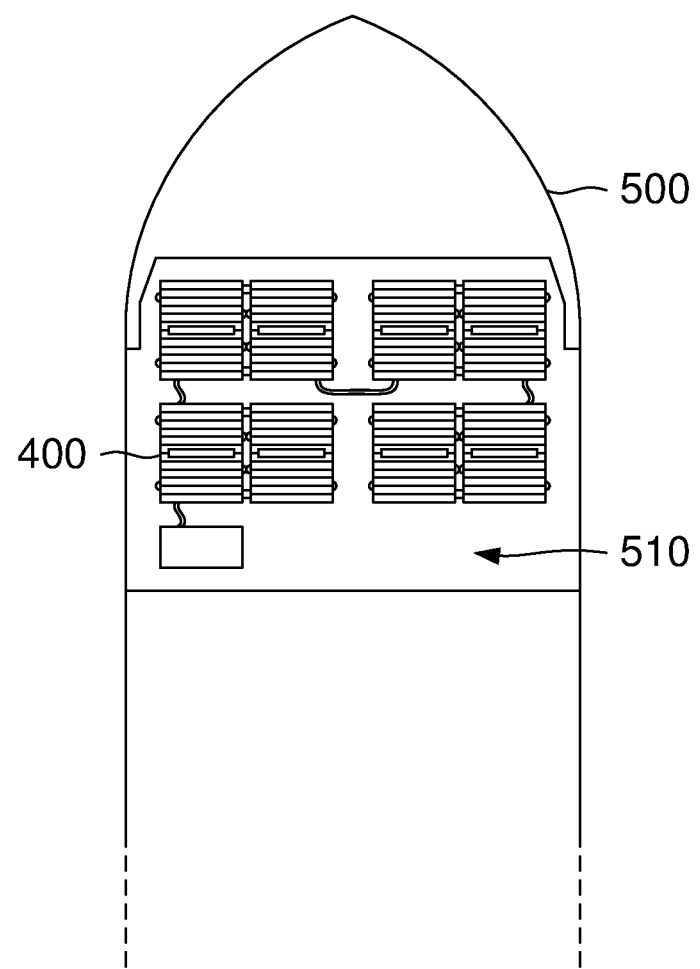
FIG. 5 illustrates a payload bay of a launch vehicle containing the satellite assembly, according to an embodiment of the present invention.

FIG. 5 illustrates the assembly 400 of FIG. 4 installed in the payload bay 510 of a launch vehicle 500. A modular launch assembly 400 such as the one shown in FIG. 4 provides a compact arrangement that can enable a plurality of satellites to be loaded into the payload bay 510 of a launch vehicle 500, while allowing the launch vehicle 500 to continually monitor the status of each satellite in the stowed configuration. Since the volume occupied by each satellite in the stowed configuration can be significantly reduced in comparison to conventional satellites, more satellites can be loaded into a payload bay of a launch vehicle.

By replacing the bus of a conventional spacecraft with a deployable body as described above, embodiments of the present invention can provide greater design flexibility in terms of the spacecraft shape and can offer larger operating surface areas while allowing the spacecraft to be folded into a compact stowed configuration for launch. For example, for a given launch mass and stowage volume, a spacecraft with a deployable body according to an embodiment of the present invention could provide higher quality data in comparison to a conventional fixed bus spacecraft structure, by being able to deploy a larger area of antenna and/or solar array for a given stowage volume. In conventional spacecraft the fixed bus occupies a relatively volume in the payload bay of the launch vehicle, meaning that less space is available for antennas and solar arrays. Larger antenna areas can provide improved resolution, whilst a larger solar array means more power is available for powering the spacecraft systems.

Whilst certain embodiments of the invention have been described herein with reference to the drawings, it will be understood that many variations and modifications will be possible without departing from the scope of the invention as defined in the accompanying claims.

The invention claimed is:

1. A spacecraft comprising:
   a plurality of sub-systems for controlling operations of the spacecraft; and
   a deployable spacecraft body comprising a plurality of panels and a plurality of hinges each connecting adjacent ones of the plurality of panels, the hinges being arranged to permit the plurality of panels to be folded into a stowed configuration and unfolded into a deployed configuration,
   wherein the plurality of sub-systems are fixed to and supported by one or more of the plurality of panels,
   wherein the plurality of panels comprise a plurality of interior panels and a plurality of peripheral panels, wherein the plurality of peripheral panels are arranged around a circumference of the body in the deployed configuration,
   wherein the plurality of interior panels have shapes such that in the deployed configuration the plurality of interior panels substantially fill available space between the plurality of peripheral panels, thereby providing a planar structure that has a substantially continuous surface in the deployed configuration.

2. The spacecraft of claim 1, wherein one or more of the plurality of hinges are configured to store elastic energy in the stowed configuration for automatically deploying the spacecraft body.

3. The spacecraft of claim 1, further comprising:
   a powered deployment mechanism for controlled deployment of the spacecraft body.

4. The spacecraft of claim 3, wherein the powered deployment mechanism is controllable to partially or fully re-stow the deployable spacecraft body while the spacecraft is in space.

5. The spacecraft of claim 1, wherein the plurality of hinges are configured to lock the spacecraft body into the deployed configuration after deployment from the stowed configuration.

6. The spacecraft of claim 1, wherein the plurality of panels and the plurality of hinges are integrally formed from a composite material, and the plurality of panels are configured to have a higher stiffness than the plurality of hinges.

7. The spacecraft of claim 1, comprising:
   a plurality of flexible electrical interconnects arranged to electrically connect ones of the plurality of sub-systems fixed to different ones of the plurality of panels.

8. The spacecraft of claim 7, wherein the plurality of panels and the plurality of hinges are integrally formed from a composite material, and the plurality of panels are configured to have a higher stiffness than the plurality of hinges, and wherein the plurality of flexible electrical interconnects are embedded in the composite material of the plurality of hinges.

9. The spacecraft of claim 1, wherein the plurality of peripheral panels are arranged to be situated further from a centre of the spacecraft body than the plurality of interior panels, in the deployed configuration,
   wherein the plurality of interior panels have a higher stiffness than the plurality of peripheral panels.

10. The spacecraft of claim 9, wherein one or more of the plurality of sub-systems are housed within one or more of the plurality of interior panels.

11. The spacecraft of claim 9, wherein the plurality of sub-systems comprise:
an attitude and orbit control sub-system for attitude control of the spacecraft, said attitude and orbit control sub-system being fixed to one or more of the interior panels.

12. The spacecraft of claim 1, further comprising:
a radio frequency RF patch mounted on a surface of one of the plurality of panels; and
a driving circuit for providing electrical power to drive the RF patch,
wherein the driving circuit is housed within said one of the plurality of panels.

13. The spacecraft of claim 1, further comprising:
a non-directly driven antenna mounted on a surface of one or more of the plurality of panels.

14. The spacecraft of claim 13, wherein the non-directly driven antenna is a holographic surface antenna or a metamaterial antenna comprising:
a plurality of antenna segments mounted on adjacent ones of the plurality of panels; and
an antenna feed connected to feed point on one of the plurality of antenna segments.

15. The spacecraft of claim 13, wherein the non-directly driven antenna is a reflect array antenna comprising:
a reflective surface mounted on one or more of the plurality of panels; and
an antenna feed arranged to illuminate the reflective surface when the plurality of panels are in the deployed configuration.

16. The spacecraft of claim 1, wherein one or more of the plurality of panels are configured to electrically shield respective ones of the plurality of sub-systems fixed thereto,
optionally wherein the plurality of hinges are arranged to connect each one of the plurality of panels to two adjacent ones of the plurality of panels,
optionally wherein the plurality of hinges are arranged to connect the plurality of panels so as to form a chain of panels connected in a loop,
optionally wherein in the deployed configuration each one of the plurality of panels is configured to abut an adjacent one of the plurality of panels, such that the spacecraft body forms a structure with a continuous surface in the deployed configuration.

17. The spacecraft of claim 1, wherein a supporting structure of the spacecraft consists or substantially consists of the deployable spacecraft body.

18. Apparatus comprising:
a plurality of stowed spacecraft each comprising a spacecraft according to claim 1 in the stowed configuration; and
a plurality of interfaces for transmitting power and telemetry data from each spacecraft to a payload monitoring unit of a launch vehicle for launching the plurality of spacecraft.

19. The apparatus of claim 18, contained in a payload bay of a launch vehicle, the launch vehicle comprising:
a payload monitoring unit arranged to deliver power to, and receive the telemetry data from, the plurality of stowed spacecraft via the plurality of interfaces for monitoring a status of each one of the plurality of stowed spacecraft.

20. A method of de-orbiting a spacecraft according to claim 1, the method comprising:
re-orienting the spacecraft such that the spacecraft body presents an increased surface area to the atmosphere in a direction of travel of the spacecraft,
optionally wherein the spacecraft is de-orbited from a low-earth orbit.

* * * * *